United States Patent
Berding et al.

(10) Patent No.: US 7,209,317 B1
(45) Date of Patent: Apr. 24, 2007

(54) DISK DRIVE HOUSING MEMBER INCLUDING AN ELECTRICALLY INSULATIVE COATING AND METALLIC PLATINGS AND METHOD OF MANUFACTURING THE SAME

(75) Inventors: Keith R. Berding, San Jose, CA (US); Norman K. Watkins, Gilroy, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 413 days.

(21) Appl. No.: 10/404,998

(22) Filed: Mar. 31, 2003

(51) Int. Cl.
*G11B 5/12* (2006.01)
(52) U.S. Cl. .................................................. 360/97.01
(58) Field of Classification Search ............... None
See application file for complete search history.

(56) References Cited

U.S. PATENT DOCUMENTS 2,793,178 A * 5/1957 Morris, Jr. ............... 205/122
4,325,780 A * 4/1982 Schulz, Sr. ................. 216/17
4,363,056 A 12/1982 Riggle et al.
5,454,157 A 10/1995 Ananth et al.
6,512,654 B2 1/2003 Teshima
6,661,603 B1 12/2003 Watkins et al.

* cited by examiner

*Primary Examiner*—David Davis
(74) *Attorney, Agent, or Firm*—Stetina, Brunda, Garred & Brucker

(57) ABSTRACT

A disk drive housing member for a disk drive. The disk drive housing member includes a housing body formed of a metallic material. The housing body includes a body surface having a coated portion and plated portions disposed throughout the coated portion. The disk drive housing member further includes an electrically insulative coating disposed upon the coated portion. The disk drive housing member further includes a metallic plating disposed upon the each respective plated portion.

8 Claims, 3 Drawing Sheets

DISK DRIVE HOUSING MEMBER INCLUDING AN ELECTRICALLY INSULATIVE COATING AND METALLIC PLATINGS AND METHOD OF MANUFACTURING THE SAME

BACKGROUND OF THE INVENTION

1. Field of the Invention

The present invention relates generally to disk drives, and in particular to a disk drive housing member including an electrically insulative coating and metallic platings, and a method of manufacturing the same.

2. Description of the Prior Art

The typical hard disk drive includes a head disk assembly (HDA) and a printed circuit board assembly (PCBA) attached to a disk drive base of the HDA. The head disk assembly includes at least one magnetic disk, a spindle motor for rotating the disk, and a head stack assembly (HSA). The spindle motor includes a spindle motor hub that is rotatably attached to the disk drive base. The hub has an outer hub flange that supports a lowermost one of the disks. Additional disks may be stacked and separated with annular disk spacers that are disposed about the hub. The head stack assembly has an actuator assembly having at least one transducer head, typically several, for reading and writing data from and to the disk. The printed circuit board assembly includes a servo control system in the form of a disk controller for generating servo control signals. The head stack assembly is controllably positioned in response to the generated servo control signals from the disk controller. In so doing, the attached heads are moved relative to tracks disposed upon the disk.

The head stack assembly includes an actuator assembly, at least one head gimbal assembly, and a flex circuit cable assembly. A conventional "rotary" or "swing-type" actuator assembly typically includes an actuator having an actuator body. The actuator body is configured to rotate on a pivot assembly between limited positions about an axis of rotation. A coil support extends from one side of the actuator body. A coil is supported by the coil support and is configured to interact with one or more permanent magnets to form a voice coil motor. One or more actuator arms extend from an opposite side of the actuator body. A head gimbal assembly includes a transducer head, typically a magneto-resistive ("MR") head, which is distally attached to each of the actuator arms. To facilitate rotational movement of the actuator, the actuator assembly further includes the actuator body that has a bore and a pivot bearing cartridge engaged within the bore.

The disk drive includes a disk drive housing with housing members, such as the disk drive base and a cover, for encompassing the other disk drive components. A plurality of fasteners, such as metal screws, are disposed about a periphery of the cover through fastener openings and engage fastener holes at the periphery of the disk drive base for attachment of the cover with the disk drive base. Typically, a fastener is engaged to the pivot bearing cartridge through the cover, and other fasteners are engaged to the spindle motor and other components to the disk drive base.

As cost considerations are always of importance, it is desirable to manufacture the housing members, such as the disk drive base and the cover, of a relatively lower cost material that satisfies the structural specifications of such housing members. For example, various metals such as cold rolled steel or aluminum are generally much less expensive than other contemporary materials utilized for such application, such as stainless steel. Such lower cost metallic materials, however, may suffer from various problems associated with corrosion and particulate contamination for example. Accordingly, there is a need in the art for an improved disk drive housing configuration in comparison to the prior art.

SUMMARY OF THE INVENTION

An aspect of the present invention can be regarded as a disk drive housing member for a disk drive. The disk drive housing member includes a housing body formed of a metallic material. The housing body includes a body surface having a coated portion and plated portions disposed throughout the coated portion. The disk drive housing member further includes an electrically insulative coating disposed upon the coated portion. The disk drive housing member further includes a metallic plating disposed upon the each respective plated portion.

According to various embodiments, the disk drive housing member may be a disk drive base. The disk drive base may include fastener holes formed therein, and the plated portions may be disposed about the fastener holes. Further, the plated portions may be disposed in the fastener holes. The disk drive base may include an arcuate shroud element, and the plated portions may be disposed upon the shroud element. The disk drive housing member may be a cover. The cover may include fastener openings formed through cover, and the plated portions may be disposed about the fastener openings. Further, the plated portions may be disposed in the fastener openings. The housing body may be formed of cold rolled steel or aluminum for example. The electrically insulative coating may be an epoxy coating. Each metallic plating may be formed of nickel or chrome for example.

According to another aspect of the invention, there is provided a disk drive. The disk drive includes a spindle motor, a magnetic disk attached to the spindle motor, and a disk drive housing supporting the spindle motor. The disk drive housing includes a disk drive housing member. The disk drive housing member is as described above.

According to yet another aspect of the invention, there is provided a method of manufacturing a disk drive housing member. The method includes providing a housing body formed of a metallic material. The housing body includes a body surface. The method further includes coating the body surface of the housing body with an electrically insulative coating. The method further includes selectively removing the electrically insulative coating about the body surface to produce exposed portions. The method further includes plating each respective exposed portion with a metallic plating.

According to various embodiments, the housing body may be coated through an electroless plating process or an electroplating process. The selective removing may include a machining process or an etching process for example. The disk drive housing member may be a disk drive base that includes fastener holes formed therein, and the method may include selectively removing the coating about the fastener holes. The disk drive base may include an arcuate shroud element, and the method may include selectively removing the coating from upon the shroud element. The disk drive housing member may be a cover. The cover may include fastener openings formed through the cover, and the method may include selectively removing the coating from out the fastener openings.

DESCRIPTION OF THE PREFERRED EMBODIMENTS

Figure 1:
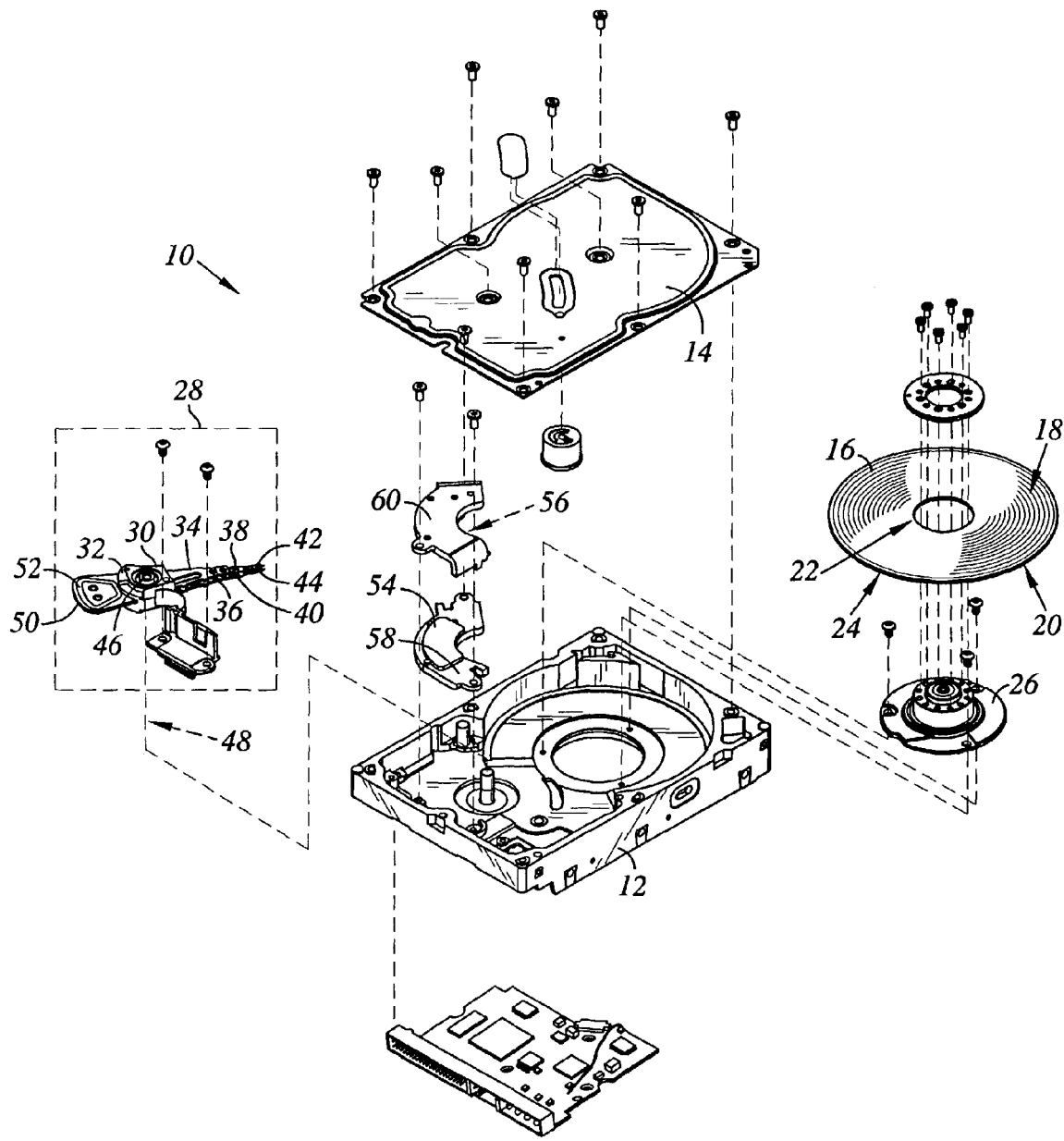
FIG. 1 is an exploded perspective view of a disk drive in accordance with the present invention.

Referring now to the drawings wherein the showings are for purposes of illustrating preferred embodiments of the present invention only, and not for purposes of limiting the same, FIGS. 1–6 illustrate a disk drive in accordance with the aspects of the present invention.

Referring now to FIG. 1, there is depicted an exploded perspective view of a disk drive 10 as constructed in accordance with an aspect of the present invention. The disk drive 10 includes a head disk assembly (ADA) and a printed circuit board assembly (PCBA). The head disk assembly includes a disk drive housing having disk drive housing members, such as a disk drive base 12 and a cover 14. The disk drive base 12 and the cover 14 collectively house at least one magnetic disk 16. The disk 16 contains a plurality of tracks for storing data. The tracks are disposed upon opposing first and second disk surfaces 18, 20 of the disk 16 that extend between an inner disk edge 22 (associated with the inner diameter) and an outer disk edge 24 (associated with the outer diameter) of the disk 16. The head disk assembly further includes a spindle motor 26 for rotating the disk 16. The head disk assembly further includes a head stack assembly 28 rotatably attached to the disk drive base 12 in operable communication with the disk 16. The head stack assembly 28 includes a rotatable actuator 30. In the embodiment shown, the actuator 30 includes an actuator body 32 and actuator arms 34, 36 that extend from the actuator body 32. Distally attached to the actuator arms 34, 36 are first and second suspensions 38, 40. The first and second suspensions 38, 40 respectively support transducer heads 42, 44. It is contemplated that the number of actuator arms may vary depending upon the number of disks and disk surfaces utilized.

The actuator body 32 includes a bore, and the actuator 30 further includes a pivot bearing cartridge 46 engaged within the bore for facilitating the actuator body 32 to rotate between limited positions about an axis of rotation 48. The actuator 30 further includes a coil support 50 that extends from one side of the actuator body 32 opposite the actuator arms 34, 36. In this embodiment, the coil support 50 is configured to support a coil 52. A pair of magnetic elements 54, 56 is supported to mounts 58, 60 which are attached to the disk drive base 12 (magnetic element 56 is indicated by the dashed lead line and it is understood the magnetic element 56 is disposed underneath the mount 60). The magnetic elements 54, 56 may be attached to the disk drive base 12 through other arrangements, such as the magnetic element 56 being directly mounted to the cover 14 which is mechanically engaged with the disk drive base 12. The coil 52 interacts with the magnetic elements 54, 56 to form a voice coil motor for controllably rotating the actuator 30.

Figure 2:
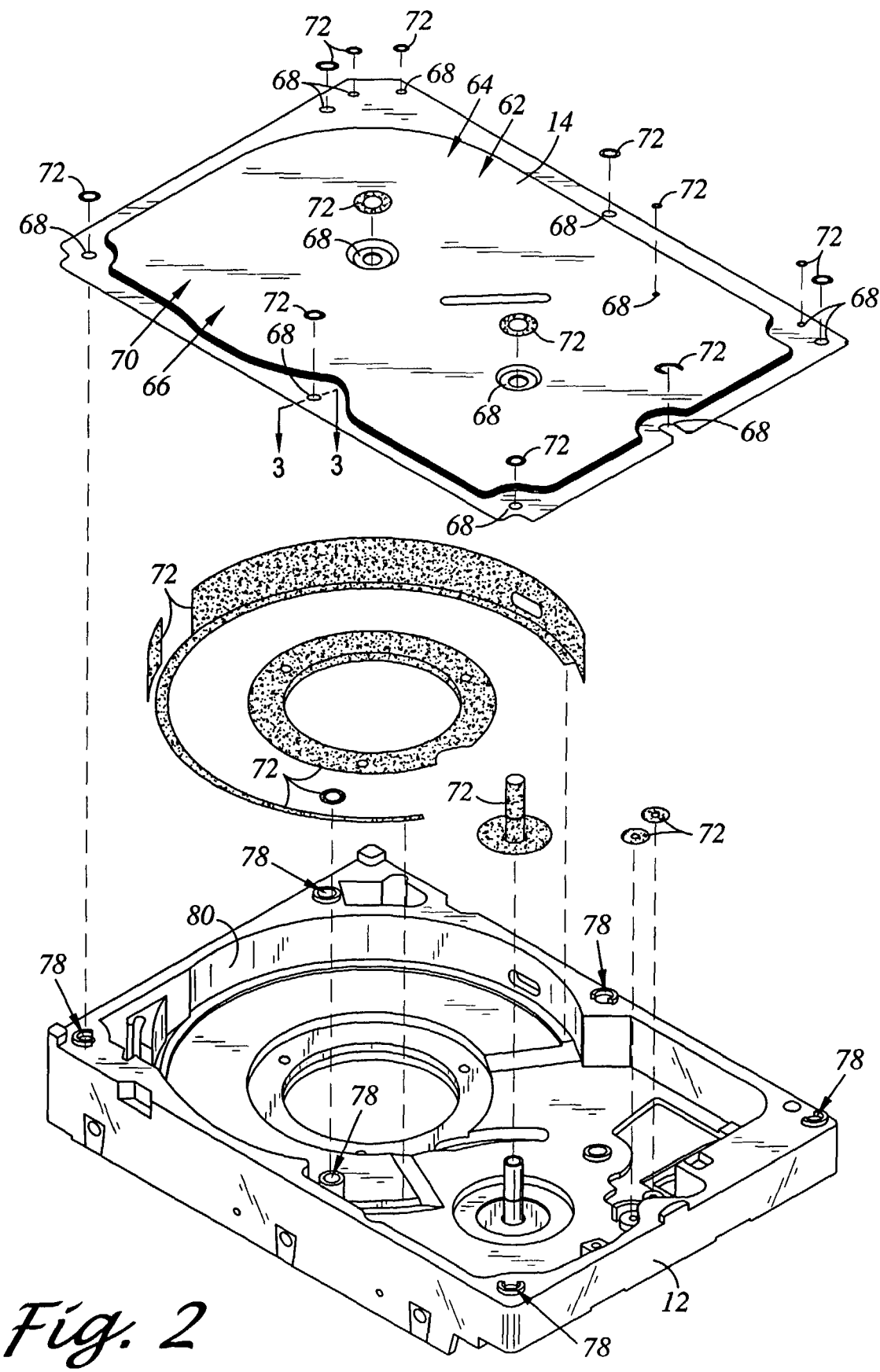
FIG. 2 is an enlarged exploded perspective view of a disk drive base and a cover and various metallic platings from about the disk drive base and the cover of FIG. 1.
Figure 3:
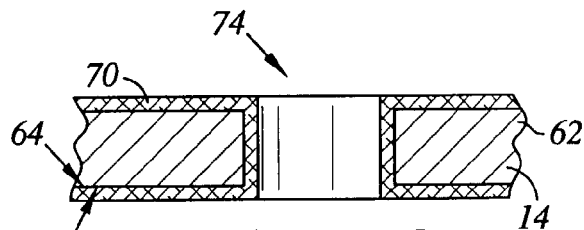
FIG. 3 is a cross-sectional view of a portion of a fastener opening of the cover as would be seen along axis 3—3 of FIG. 2, however illustrating an initial step of coating a disk drive housing member with an electrically insulative coating of the method of manufacturing the same.
Figure 4:
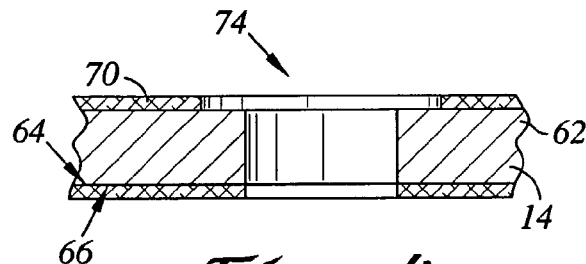
FIG. 4 is a cross-sectional view of the portion of the fastener opening of FIG. 3, however, as shown with a portion of the electrically insulative coating removed.
Figure 5:
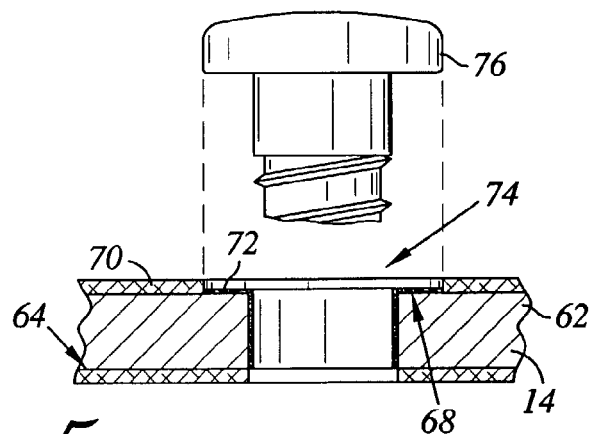
FIG. 5 is a cross-sectional view of the portion of the fastener opening of FIG. 4, however, as shown with metallic platings disposed upon the cover where the electrically insulative coating has been removed, and as shown in relation to a fastener.
Figure 6:
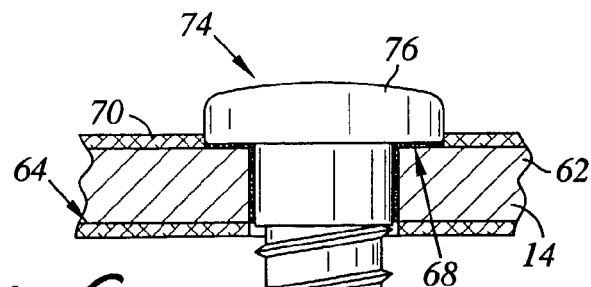
FIG. 6 is a cross-sectional view of the portion of the fastener opening of FIG. 5, however, as shown with the fastener engaged through the fastener opening.

An aspect of the present invention can be regarded as a disk drive housing member for the disk drive 10. The disk drive housing member may take the form of the disk drive base 12 or the cover 14. Referring additionally to FIG. 2, there is depicted an enlarged exploded perspective view of the disk drive base 12 and the cover 14 of FIG. 1. Reference is further directed to FIG. 5 which depicts a cross-sectional view of a fastener opening 74 of the cover 14 as seen along axis 3—3 of FIG. 2. The disk drive housing member, such as the cover 14, includes a housing body 62 formed of a metallic material. The housing body 62 includes a body surface 64 having a coated portion 66 and plated portions 68 disposed throughout the coated portion 66. The disk drive housing member further includes an electrically insulative coating 70 disposed upon the coated portion 66. The disk drive housing member further includes a metallic plating 72 disposed upon the each respective plated portion 68.

The housing body 62 may be formed of cold rolled steel or aluminum for example. In this regard, it is generally recognized that such materials may be less expensive than other materials currently used in the art such as stainless steel. However, such materials may be subject to excessive corrosion or have associated problems with surface residue or particles that may result in contamination of the interior of the disk drive (i.e., cleanliness problems). As such, the electrically insulative coating 70 may be utilized to mitigate against such concerns. The electrically insulative coating 70 may be an epoxy coating or E-coat. Each metallic plating 72 may be formed of nickel, chrome, or zinc chromate, for example.

However, it is recognized that it is not desirable to have such electrically insulative coating 70 disposed about the entire body surface 64 for a number of reasons. For example, wear may be of concern. At specific locations where fasteners engage the electrically insulative coating 70, the electrically insulative coating 70 may be dislodged resulting in particulate contamination of the interior of the disk drive 10.

The present invention recognizes such concerns and therefore requires that the metallic platings 72 be disposed upon the plated portions 68. As such, while plated surfaces are recognized as generally good wear surfaces, and plating the entire body surface 64 may address the problem of dislodged material associated with an E-coat, plating processes are a relatively more expensive process than an E-coat process. As such, the present invention strikes a balance between the cost benefits of using the electrically insulative coating 70 and selectively disposing the metallic platings 72 where needed, such as to address specific wear problems.

Another concern with entirely coating the housing body 72 may be associated with electrical grounding of the housing member. For example, where the body surface 64 of the cover 14 is entirely coated with the electrically insulative coating 70, there would be a problem of not having an electrical ground path to the housing body 62. However, by providing the metallic platings, electrically ground paths may be readily established such as though fasteners 76 contacting the metallic platings 72.

As mentioned above, the disk drive housing member may be a cover 14. The cover 14 may be of a laminate nature. For example, the cover 14 may be formed of a damped metallic laminate which may includes multiple metallic layers with a viscoelastic layer disposed between the metallic layers. The cover may include fastener openings 74 formed through the cover 14. Various fasteners 76 may be disposed through the fastener openings 74 to engage the disk drive base 12. The plated portions 68 may be disposed about the fastener openings 74. Further, the plated portions 74 may be disposed in the fastener openings 74, such as seen in the cross-sectional views of FIGS. 5 and 6. Alternatively, the electrically insulative coating 70 may be disposed in the fastener openings 74. Where the cover 14 is of a laminate nature, such electrically insulative coating 70 may act as a seal at the exposed edges of the various laminate layers within the fastener openings 74.

As further mentioned above, the disk drive housing member may be the disk drive base 12. The disk drive base 12 may include fastener holes 78 formed therein as seen in FIG. 1. The plated portions 68 may be disposed about the fastener holes 78. Further, the plated portions 68 may be disposed in the fastener holes 78. Alternatively, the electrically insulative coating 70 may be disposed in the fastener holes 78. It is recognized that such plated portions 68 need not be limited to being associated with fasteners 76. For example, the disk drive base 12 may include an arcuate shroud element 80, and the plated portions 68 may be disposed upon the shroud element 80.

According to another aspect of the invention, there is provided a disk drive 10. The disk drive 10 includes the spindle motor 26, the magnetic disk 16 attached to the spindle motor 26, and the disk drive housing member supporting the spindle motor 26. The disk drive housing member is as described above.

According to yet another aspect of the invention, there is provided a method of manufacturing the disk drive housing member. The method includes providing the housing body 62 formed of a metallic material such as shown for example in FIG. 3. The housing body 62 includes the body surface 64. As shown as further example in FIG. 4, the method further includes coating the body surface 64 of the housing body 62 with the electrically insulative coating 70. As shown as further example in FIG. 5, the method further includes selectively removing the electrically insulative coating 70 about the body surface 64 to produce exposed portions. The method further includes plating each respective exposed portion with a metallic plating 72. In this regard, the exposed portions become plated portions 68 of the body surface 64. As such, the electrically insulative coating 70 acts as a mask for the plating process.

In the example shown in FIGS. 3–5, FIG. 6 shows a fastener 76 as engaged through the fastener opening 74. The metallic plating 72 may be selectively located such that the fastener 76 does not wear against the electrically insulative coating 70, but rather contacts the metallic plating 72. According to various embodiments, the housing body 62 may be coated through an electroless plating process or an electro-plating process. The selective removing may include a machining process (including milling, turning and drilling) or an etching process (including chemical etching and laser etching) for example. The selective removing of the electrically insulative coating 70 may be performed about the fastener holes 78, the fastener openings 74, and the arcuate shroud element 80.

We claim:

1. A method of manufacturing a disk drive housing member, the method comprising:
   providing a housing body formed of a metallic material, the housing body including a body surface;
   coating the body surface of the housing body with an electrically insulative coating;
   removing the electrically insulative coating about the body surface to produce exposed portions; and
   plating each respective exposed portion with a metallic plating.

2. The method of claim 1 wherein the housing body is coated through an electroless plating process.

3. The method of claim 1 wherein the housing body is coated through an electro-plating process.

4. The method of claim 1 wherein the act of removing includes a machining process.

5. The method of claim 1 wherein the act of removing includes an etching process.

6. The method of claim 1 wherein the disk drive housing member is a disk drive base, the disk drive base including fastener holes formed therein, the act of removing including removing the coating about the fastener holes.

7. The method of claim 1 wherein the disk drive housing member is a disk drive base, the disk drive base including an arcuate shroud element, the act of removing including removing the coating from upon the shroud element.

8. The method of claim 1 wherein the disk drive housing member is a cover, the cover including fastener openings formed through the cover, the act of removing including removing the coating from about the fastener openings.

* * * * *